United States Patent
Hiei et al.

(10) Patent No.: US 9,725,117 B2
(45) Date of Patent: Aug. 8, 2017

(54) PARKING ASSIST SYSTEM (71) Applicant: TOYOTA JIDOSHA KABUSHIKI KAISHA, Toyota-shi, Aichi-ken (JP)

(72) Inventors: Yu Hiei, Susono (JP); Ryuji Okamura, Gotemba (JP); Koichiro Yamauchi, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/101,669

(22) PCT Filed: Dec. 2, 2014

(86) PCT No.: PCT/IB2014/002604
§ 371 (c)(1),
(2) Date: Jun. 3, 2016

(87) PCT Pub. No.: WO2015/082971
PCT Pub. Date: Jun. 11, 2015

(65) Prior Publication Data
US 2016/0375933 A1    Dec. 29, 2016

(30) Foreign Application Priority Data
Dec. 6, 2013 (JP) ................................ 2013-253226

(51) Int. Cl.
*B62D 15/02*    (2006.01)
*B62D 5/04*    (2006.01)

(52) U.S. Cl.
CPC ......... *B62D 15/0285* (2013.01); *B62D 5/046* (2013.01); *B62D 5/0469* (2013.01); *B62D 5/0496* (2013.01); *B62D 15/028* (2013.01)

(58) Field of Classification Search
CPC .. B62D 15/0285; B62D 5/046; B62D 5/0469; B62D 5/0496; B62D 15/028
See application file for complete search history.

(56) References Cited

U.S. PATENT DOCUMENTS 4,986,379 A * 1/1991 Morishita ............ B62D 5/0463
180/446
6,326,753 B1 * 12/2001 Someya ............... B62D 5/0463
180/443

(Continued)

FOREIGN PATENT DOCUMENTS

JP    2002137750 A  *  5/2002
JP    2003-341543 A    12/2003

(Continued)

OTHER PUBLICATIONS

Jin-Yan et al., "Development of active steering angle control based on electric power steering systems," Year: 2011, pp. 1-6.*

(Continued)

*Primary Examiner* — Tuan C. To
(74) *Attorney, Agent, or Firm* — Sughrue Mion, PLLC (57) ABSTRACT

A parking assist system parks a vehicle at a target parking position by automatically steering an EPS. The parking assist system includes a acquiring unit configured to acquire the position of the vehicle, a position determining unit configured to determine the target parking position, a generating unit configured to generate a path from the position of the vehicle to the target parking position, a detecting unit configured to detect the temperature of the EPS, and a assist unit configured to automatically steer the vehicle so as to move along the path generated by the generating unit. The generating unit generates a path in which a degree of stationary steering by which the vehicle is steered in a state where the vehicle stops is small when the temperature of the EPS is high, compared with when the temperature of the EPS is low.

7 Claims, 10 Drawing Sheets

(56) References Cited

U.S. PATENT DOCUMENTS

| | | | | |
|---|---|---|---|---|
| 7,526,368 B2 * | 4/2009 | Endo | ............... | B62D 15/0285 |
| | | | | 701/300 |
| 9,260,090 B2 * | 2/2016 | Toledo | ............... | B60T 7/22 |
| 2005/0257986 A1 * | 11/2005 | Kagei | ............... | B62D 5/0496 |
| | | | | 180/404 |
| 2005/0269150 A1 * | 12/2005 | Fujimoto | ............... | B62D 5/046 |
| | | | | 180/446 |
| 2006/0235590 A1 * | 10/2006 | Bolourchi | ............... | B62D 7/159 |
| | | | | 701/41 |
| 2008/0033647 A1 * | 2/2008 | Milark | ............... | G01S 15/18 |
| | | | | 701/300 |
| 2011/0035107 A1 * | 2/2011 | Izutani | ............... | B62D 5/0457 |
| | | | | 701/41 |
| 2011/0282551 A1 * | 11/2011 | Sasaki | ............... | B62D 5/0463 |
| | | | | 701/42 |
| 2013/0073119 A1 * | 3/2013 | Huger | ............... | B62D 15/027 |
| | | | | 701/1 |
| 2013/0151412 A1 * | 6/2013 | Spahl | ............... | G06Q 20/40 |
| | | | | 705/44 |
| 2014/0074338 A1 * | 3/2014 | Nordbruch | ............ | B60W 40/08 |
| | | | | 701/23 |

FOREIGN PATENT DOCUMENTS

| | | | | |
|---|---|---|---|---|
| JP | EP 1905669 A1 * | 4/2008 | ............ | B62D 5/0463 |
| JP | EP 1935753 A1 * | 6/2008 | ............ | B62D 5/0469 |
| JP | EP 2088058 A2 * | 8/2009 | ............ | B62D 5/0463 |
| JP | 2010-228591 A | 10/2010 | | |
| JP | EP 2322408 A2 * | 5/2011 | ............ | B62D 5/046 |

OTHER PUBLICATIONS

Gao et al., "Electric power steering system based on fuzzy PID control," Year: 2009, pp. 3-456-3-459.*

* cited by examiner

PARKING ASSIST SYSTEM

BACKGROUND OF THE INVENTION

1. Field of the Invention

The present invention relates to a parking assist system that assists a vehicle in parking by automatic steering using an electric power steering unit.

2. Description of Related Art

A parking assist system is known which assists a vehicle in parking by automatic steering using an electric power steering unit. Japanese Unexamined Patent Application Publication No. 2003-341543 (JP 2003-341543 A) describes a parking assist system that automatically performs a steering operation. In the parking assist system, stationary steering of performing a steering operation in a state where a vehicle stops is carried out.

When the stationary steering is carried out as described above in a state where the temperature of the electric power steering unit is high, the temperature of the electric power steering unit further rises due to generation of heat and there is a possibility that the electric power steering unit will lose functionality. Japanese Unexamined Patent Application Publication No. 2010-228591 (JP 2010-228591 A) describes a parking assist controller that includes a temperature sensor measuring the temperature of a motor of an electric power steering unit and an ambient temperature sensor measuring the ambient temperature of the electric power steering unit. When the temperature of the motor measured by the temperature sensor departs from a predetermined temperature range or the ambient temperature of the electric power steering unit measured by the ambient temperature sensor departs from a predetermined temperature range, the parking assist controller stops parking assist.

However, when the parking assist using the electric power steering unit is stopped, the vehicle has to be parked by the driver's steering operation.

SUMMARY OF THE INVENTION

The invention provides a parking assist system that can continue to appropriately parking assist using electric power steering unit even when the temperature of the electric power steering unit is high.

According to an aspect of the invention, there is provided a parking assist system that assists a vehicle in parking at a target parking position by automatic steering using an electric power steering unit. The parking assist system includes: a vehicle position acquiring unit configured to acquire the position of the vehicle; a target parking position determining unit configured to determine the target parking position; a path generating unit configured to generate a path from the position of the vehicle to the target parking position; a temperature detecting unit configured to detect the temperature of the electric power steering unit; and a parking assist unit configured to automatically steer the vehicle so as to move along the path generated by the path generating, unit, wherein the path generating unit generates a path in which a degree of stationary steering by which the vehicle is steered in a state where the vehicle stops is small when the temperature of the electric power steering unit detected by the temperature detecting unit is high, compared with when the temperature of the electric power steering unit is low.

In the aspect, a path generating unit generates a path in which a degree of stationary steering is small when the temperature of the electric power steering unit is high, compared with when the temperature of the electric power steering unit is low. Accordingly, since the path in which the degree of stationary steering is small is generated in a state where the temperature of the electric power steering unit is high, it is possible to avoid a situation in which the temperature of the electric power steering unit is excessively high due to generation of heat at the time of stationary steering. Even when the temperature of the electric power steering unit is high, the automatic steering using the electric power steering unit is not stopped by, simply generating the path in which the degree of stationary steering is small. Accordingly, it is possible to continue to perform the parking assist using the electric power steering unit even when the temperature of the electric power steering is high.

In the aspect, the path generating unit may generate a path not including the stationary steering when the temperature of the electric power steering unit detected by the temperature detecting unit is higher than the predetermined temperature threshold value.

Accordingly, when the temperature of the electric power steering unit is higher than the temperature threshold value, the path generating unit generates the path not including the stationary steering and thus the stationary steering is not performed when the temperature of the electric power steering unit is high. As a result, it is possible to suppress the excessive rise in temperature of the electric power steering unit and to continue to perform automatic steering using the electric power steering unit.

In the aspect, the path generating unit may estimate an allowable degree of stationary steering on the basis of the temperature and may set the degree of stationary steering with the allowable degree of stationary steering as an upper limit when the path generating unit generates a path including the stationary steering on the basis of the temperature of the electric power steering unit detected by the temperature detecting unit.

In this case, the allowable degree of stationary steering is estimated on the basis of the temperature of the electric power steering unit and the degree of stationary steering is set with the allowable degree of stationary steering as an upper limit. Accordingly, it is possible to suppress the generation of heat due to the stationary steering by estimating the allowable degree of stationary steering, which is the upper limit of the degree of stationary steering, to be small when the temperature of the electric power steering unit is high. As a result, it is possible to suppress the excessive rise in temperature of the electric power steering unit.

In the aspect, the parking assist system may further include a vehicle speed setting unit configured to set a vehicle speed of the vehicle, and the vehicle speed setting unit may set the vehicle speed of the vehicle so that the vehicle speed of the vehicle moving on the path is lower than an initially-set speed when a path not including the stationary steering is generated by the path generating unit and it is determined that the steering based on the initially-set speed is not possible in a state where the vehicle moves along the path.

Here, when a path not including the stationary steering is generated by the path generating unit, the degree of steering has to be changed only during movement of the vehicle. Accordingly, the degree of steering required during movement of the vehicle is great, compared with the case where a path including the stationary steering is generated. Therefore, when the vehicle moves at the initially-set speed on the generated path, a steering speed for controlling the vehicle with a degree of steering required for moving on the path may increase and thus the vehicle may not follow the steering speed. As a result, a path not including the stationary steering is generated by setting the vehicle speed of the vehicle so that the vehicle speed is lower than the initially-set speed when the vehicle speed setting unit determines that the steering is not possible. Accordingly, even when the degree of steering required for moving on the generated path increases, it is possible to reduce the steering speed required for movement on the path and to cause the vehicle to move along the path.

In the aspect, the parking assist system may further include a weight information acquiring unit configured to acquire weight information of the vehicle that is information on the weight of the vehicle, and the path generating unit may generate a path in which the degree of stationary steering is small when the path generating unit generates a path including the stationary steering and the weight of the vehicle acquired by the weight information acquiring unit is greater than a predetermined weight threshold value, compared with when the weight of the vehicle is equal to or less than the weight threshold value.

Since the load applied to the electric power steering unit increases with the increase in the weight of the vehicle, the temperature of the electric power steering unit is likely to further rise. Accordingly, it is possible to suppress the rise in temperature of the electric power steering unit by generating a path in which the degree of stationary steering is small when the weight of the vehicle is greater than the weight threshold value.

In the aspect, the parking assist system may further include a friction coefficient calculating unit configured to calculate a friction coefficient of a road surface around the vehicle, and the path generating unit may generate a path in which the degree of stationary steering is small when the path generating unit generates a path including the stationary steering and the friction coefficient calculated by the friction coefficient calculating unit is greater than a predetermined friction coefficient threshold value, compared with when the friction coefficient is equal to or less than the friction coefficient threshold value.

Since the load applied to the electric power steering unit increases on a road surface having a large friction coefficient, the temperature of the electric power steering unit is likely to further rise. Accordingly, it is possible to suppress the rise in temperature of the electric power steering unit by generating a path in which the degree of stationary steering is small when the friction coefficient of the road surface is greater than the friction coefficient threshold value.

In the aspect, the temperature of the electric power steering unit may include the temperature of a motor of the electric power steering unit and the temperature of an ECU of the electric power steering unit.

In this case, the path generating unit generates the path on the basis of both the temperature of the motor of the electric power steering unit and the temperature of the ECU of the electric power steering unit. Accordingly, even when the temperature of any one of the motor and the ECU of the electric power steering unit rises, the path generating unit generates the path not including the stationary steering. As a result, it is possible to suppress the rise in temperature of the motor of the electric power steering unit and the ECU of the electric power steering unit.

According to the aspect, it is possible to continue to appropriately perform the parking assist using the electric power steering unit even when the temperature of the electric power steering unit is high.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described with reference to the accompanying drawings. In the following description, like or corresponding elements will be referenced by like reference numerals and description thereof will not be repeated.

First Embodiment

Figure 1:
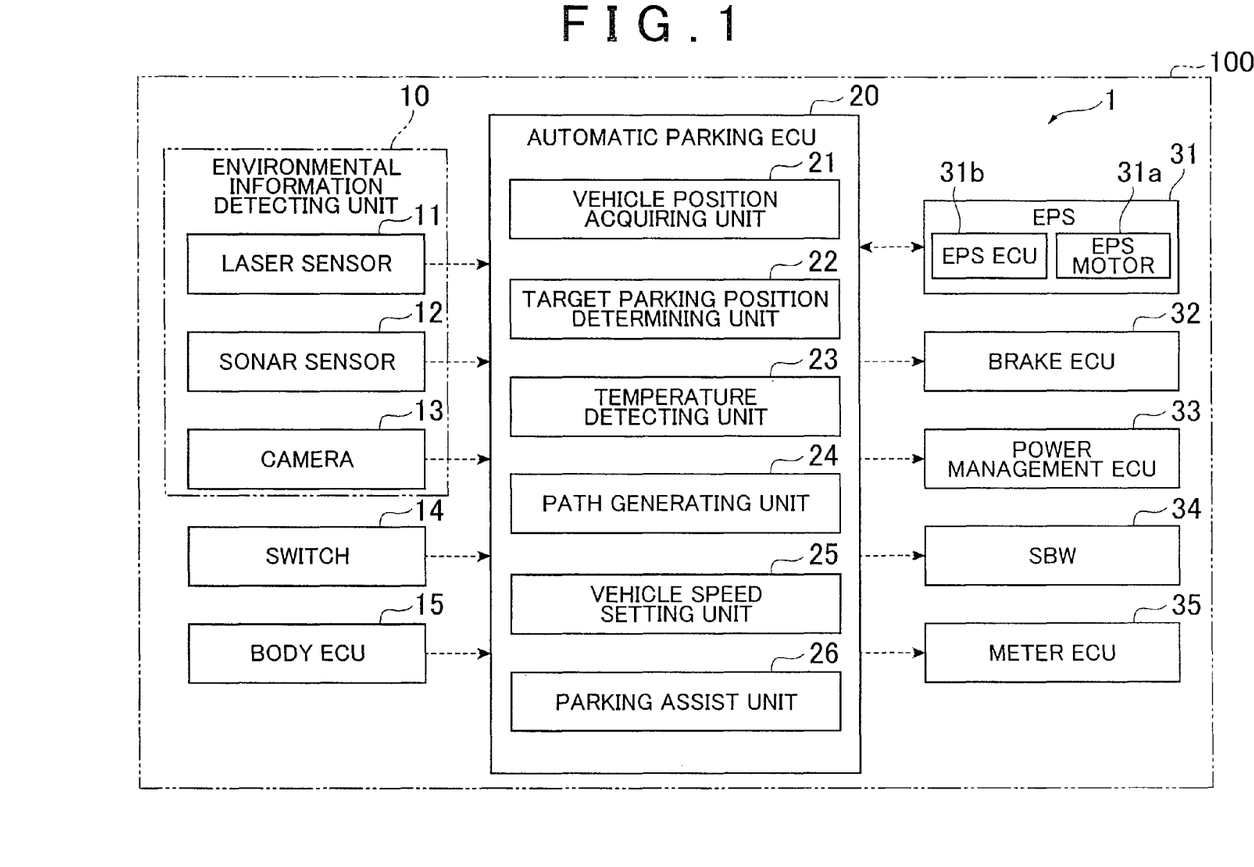
FIG. 1 is a block diagram illustrating a parking assist system according to a first embodiment of the invention.
Figure 2:
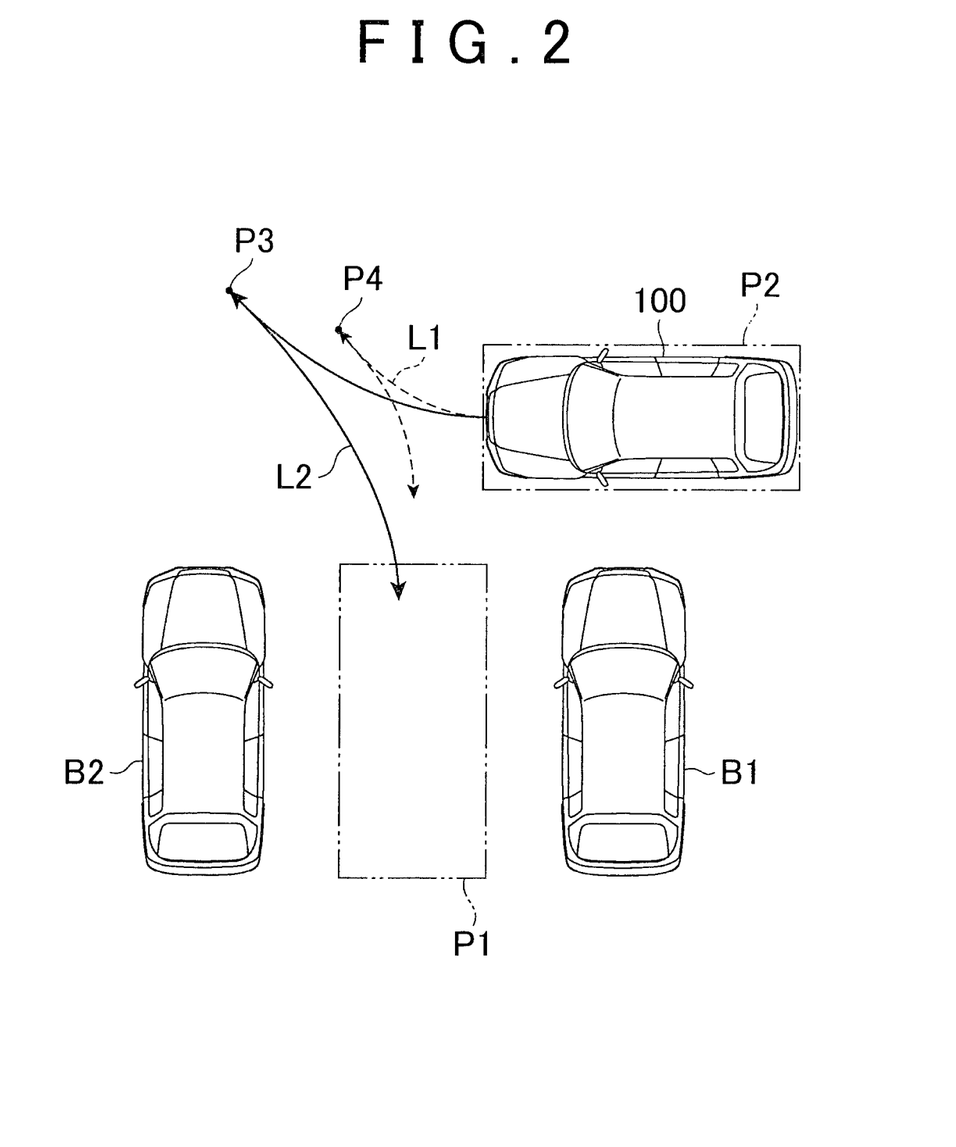
FIG. 2 is a diagram illustrating a path of a vehicle that parks using the parking assist system illustrated in FIG. 1.

As illustrated FIGS. 1 and 2, a parking assist system 1 according to this embodiment is a system that automatically parks a vehicle 100, in which a path generating unit 24 generates a path from a stop position P2 to a target parking position P1, for example, in a state where the vehicle 100 stops at the stop position P2. The target parking position P1 represents a target position at which the vehicle 100 parks in an area in which a parking space for the vehicle 100 is present such as a parking lot.

The parking assist system 1 performs a parking assist operation of parking the vehicle 100 at the target parking position P1 by causing the vehicle 100 to move along the path using an electric power steering (EPS) unit 31 automatically steering the vehicle 100. Here, the parking assist means assisting the parking of the vehicle 100 using an automatic steering operation of controlling the EPS unit 31 of the vehicle 100. The EPS unit 31 includes an EPS motor 31*a* automatically steering the vehicle 100 and an EPS electronic control unit (ECU) 31*b* controlling an operation of the EPS motor 31*a*. The EPS ECU 31*b* includes a central processing unit (CPU), a read only memory (ROM), and a random access memory (RAM).

The parking assist system 1 is mounted on the vehicle 100. The parking assist system 1 includes an environmental information detecting unit 10, a switch 14, a body ECU 15, an automatic parking ECU 20, an EPS unit 31, a brake ECU 32, a power management ECU 33, a shift-by-wire (SBW)

unit 34, and a meter ECU 35. Each of the body ECU 15, the brake ECU 32, the power management ECU 33, and the meter ECU 35 includes a CPU, a ROM, and a RAM.

The environmental information detecting unit 10 has a function of detecting environmental information of the vehicle 100. The environmental information detecting unit 10 includes a laser sensor 11 detecting a neighboring object of the vehicle 100 using a laser beam, a sonar sensor 12 detecting a neighboring object of the vehicle 100 using ultrasonic waves, and a camera 13 acquiring a captured image around the vehicle 100. The environmental information detecting unit 10 detects objects (for example, vehicles B1, B2) located on the front, rear, and lateral sides of the vehicle 100 and the gradient of a road surface around the vehicle 100.

The automatic parking ECU 20 is connected to the environmental information detecting unit 10. The environmental information detecting unit 10 outputs a detection signal relevant to an obstacle located around the vehicle 100 and a detection signal relevant to the gradient of the road surface around the vehicle 100 to the automatic parking ECU 20. The unit detecting environmental information of the vehicle 100 is not limited to the environmental information detecting unit 10 including the laser sensor 11, the sonar sensor 12, and the camera 13, and another unit such as a road-vehicle communication unit may be used.

The switch 14 is a parking assist switch for starting or ending the parking assist using the parking assist system 1. The switch 14 is, for example, an ON/OFF switch. The parking assist using the parking assist system 1 is started when a driver of the vehicle 100 turns on the switch 14 and the parking assist using the parking assist system 1 is ended when the driver of the vehicle 100 turns off the switch 14.

The switch 14 is disposed at a position at which the switch, can be easily operated by the driver of the vehicle 100 during movement of the vehicle 100. The switch 14 is connected to the automatic parking. ECU 20 and outputs the ON/OFF state set by the driver of the vehicle 100 as a switch signal to the automatic parking ECU 20. As the switch 14, for example, a hardware switch that is disposed in a center console or a steering wheel of the vehicle 100 and that can be pressed by the driver or a software switch that is displayed on an onboard display and that can be operated by allowing the driver to touch the onboard display can be used.

The body ECU 15 serves as a weight information acquiring unit acquiring weight information which is information relevant to the weight of the vehicle 100. Here, the weight information is information including a superimposed load of the vehicle 100 including occupant weights of the vehicle 100 and front and rear balance weights in the vehicle 100. The body ECU 15 acquires the superimposed load of the vehicle 100 and the front and rear balance weights in the vehicle 100, for example, from a weight sensor. The body ECU 15 may calculate the balance weight of the vehicle 100 on the basis of the road surface gradient and the tilt information of the vehicle body of the vehicle 100. The body ECU 15 is connected to the automatic parking ECU 20 and outputs the acquired weight information to the automatic parking ECU 20.

The automatic parking ECU 20 assists the vehicle 100 in parking by controlling the operations of the units of the vehicle 100 to cause the vehicle 100 to automatically move and to park the vehicle 100 at the target parking position P1. The automatic parking ECU 20 includes a vehicle position acquiring unit 21, a target parking position determining unit 22, a temperature detecting unit 23, a path generating unit 24, a vehicle speed setting unit 25, and a parking assist unit 26. The automatic parking ECU 20 includes a CPU, a ROM, and a RAM. The automatic parking ECU 20 is an electronic control unit comprehensively controlling the parking assist system 1. The automatic parking ECU 20 outputs a driving force control signal to actuators of the vehicle 100 to control the driving force of the vehicle 100.

The automatic parking ECU 20 realizes the functions of the vehicle position acquiring unit 21, the target parking position determining unit 22, the temperature detecting unit 23, the path generating unit 24, the vehicle speed setting unit 25, and the parking assist unit 26 by loading an application program stored in the ROM to the RAM and causing the CPU to execute the application program. The EPS unit 31, the brake ECU 32, the power management ECU 33, the SBW unit 34, and the meter ECU 35 are connected to the automatic parking ECU 20.

The vehicle position acquiring unit 21 has a function of acquiring the position of the vehicle 100. The vehicle position acquiring unit 21 acquires the position of the vehicle 100 when the switch 14 is turned on by the driver of the vehicle 100 and the parking assist using the parking assist system 1 is performed. The vehicle position acquiring unit 21 acquires a stop position P2 or the like as the current position of the vehicle 100, for example, by positioning the vehicle 100 using a GPS.

The target parking position determining unit 22 has a function of determining the target parking position P1. The target parking position determining unit 22 determines the target parking position P1 that is a parking area using the detection signal relevant to the obstacles and the detection signal relevant to the gradient of the road surface acquired from the environmental information detecting unit 10. The target parking position determining unit 22 may determine the target parking position P1 by displaying candidates for the target parking position for the driver of the vehicle 100 and allowing the driver to select the target parking position P1.

The temperature detecting unit 23 has a function of detecting the temperature of the EPS unit 31. The temperature detecting unit 23 receives the temperature of the EPS motor 31a including a coil or a magnet and the temperature of the EPS ECU 31b including a switching element causing a current to flow or the like from the EPS unit 31.

The path generating unit 24 has a function of generating a path from the stop position P2 of the vehicle 100 to the target parking position P1. The path generating unit 24 generates any one of a path L1 including stationary steering of steering the vehicle 100 in a state where the vehicle 100 stops and a path L2, not including the stationary steering on the basis of the temperature of the EPS unit 31 (the EPS motor 31a and the EPS ECU 31b) detected by the temperature detecting unit 23. The stationary steering means turning the steering wheel in the state where the vehicle 100 stops.

The path generating unit 24 generates the path L1 when both the temperature of the EPS motor 31a and the temperature of the EPS ECU 31b are equal to or lower than a predetermined temperature threshold value T1, and generates the path L2 when one of the temperature of the EPS motor 31a and the temperature of the EPS ECU 31b is higher than the temperature threshold value T1. The temperature threshold value T1 is a temperature serving as the basis of the determination of whether to interfere with the operation of the EPS unit 31 (the EPS motor 31a and the EPS ECU 31b) and is a value set in advance depending on the specification or environment of the EPS unit 31. The temperature threshold value T1 can be appropriately changed. This embodiment will describe an example where the path generating unit 24 generates the path L1 including the stationary steering and the path L2 not including the stationary steering, but the path generating unit 24 may generate three or more paths.

The vehicle speed setting unit 25 sets the vehicle speed at which the vehicle 100 moves on the path L1 or the path L2 generated by the path generating unit 24. The vehicle speed setting unit 25 sets the vehicle speed at the points of the path L1 or the path L2. For example, the vehicle speed setting unit 25 may set the vehicle speed of the vehicle 100 on the basis of the gradient of the road surface detected by the environmental information detecting unit 10 or the weight information acquired by the body ECU 15.

The parking assist unit 26 automatically steers the vehicle 100 so as to move along the path L1 or the path L2 generated by the path generating unit 24. The parking assist unit 26 assists the vehicle 100 in moving at the vehicle speed set by the vehicle speed setting unit 25 and parking. The parking assist unit 26 outputs signals to the EPS unit 31, the brake ECU 32, the power management ECU 33, the SBW unit 34, and the meter ECU 35 to control the operations of the units of the vehicle 100. The parking assist unit 26 determines whether the vehicle 100 reaches a quick turn position P3 or P4 or whether the parking of the vehicle 100 is completed.

The EPS unit 31 is an electric power steering unit that applies a steering assist torque from the EPS motor 31a to a steering mechanism of the vehicle 100. The EPS ECU 31b receives path information on the path L1 or the path L2 from the parking assist unit 26 and sets a target degree of steering of the vehicle 100 at positions until the vehicle 100 reaches the target parking position P1. The EPS ECU 31b calculates a target current value so as to steer the vehicle 100 with a set degree of steering. The EPS ECU 31b applies a current to the EPS motor 31a so that the current value of the EPS motor 31a reaches the target current value.

The brake ECU 32 is an ECU for controlling the brake (braking force) of the vehicle wheels in the vehicle 100. The brake ECU 32 calculates a requested braking force (target deceleration) and controls a braking oil pressure of a wheel cylinder in each vehicle wheel of the vehicle 100 so that the braking force of the vehicle 100 reaches the requested braking force. In this embodiment, the brake ECU 32 receives a brake control signal from the parking assist unit 26 and calculates the requested braking force depending on the received brake control signal. The brake ECU 32 performs the braking force control on the driving force of the vehicle 100 controlled by the automatic parking ECU 20 so that the vehicle speed of the vehicle 100 reaches the vehicle speed set by the vehicle speed setting unit 25.

The power management ECU 33 manages supply of power to various units mounted on the vehicle 100. The power management ECU 33 receives a power supply management signal from the parking assist unit 26 and manages the supply of power to various units depending on the received power supply management signal.

The SBW unit 34 changes the transmission mode of the vehicle 100 by detecting the position of a shift lever of the vehicle 100 as an electrical signal and transmits the detected electrical signal to the shift gear via a signal line (wire). The SBW unit 34 receives a shift control signal from the parking assist unit 26 and changes the transmission mode of the vehicle 100 depending on the shift control signal.

The meter ECU 35 comprehensively controls the meter units disposed in the vehicle 100. Information on the parking assist of the parking assist system 1 is displayed on the meter units. The information on the parking assist includes information on the paths L1, L2 generated by the path generating unit 24, information of whether to perform the stationary steering, an alarm notifying the driver of the vehicle 100 that the hand and the foot are detached from the steering wheel and the brake of the vehicle 100 before the vehicle 100 starts from the stop position P2, and information on the distance until the vehicle 100 reaches the target parking position P1. The meter ECU 35 notifies the driver of the vehicle 100 of the information on the parking assist by displaying the above-mentioned information on the meter units.

Figure 3:
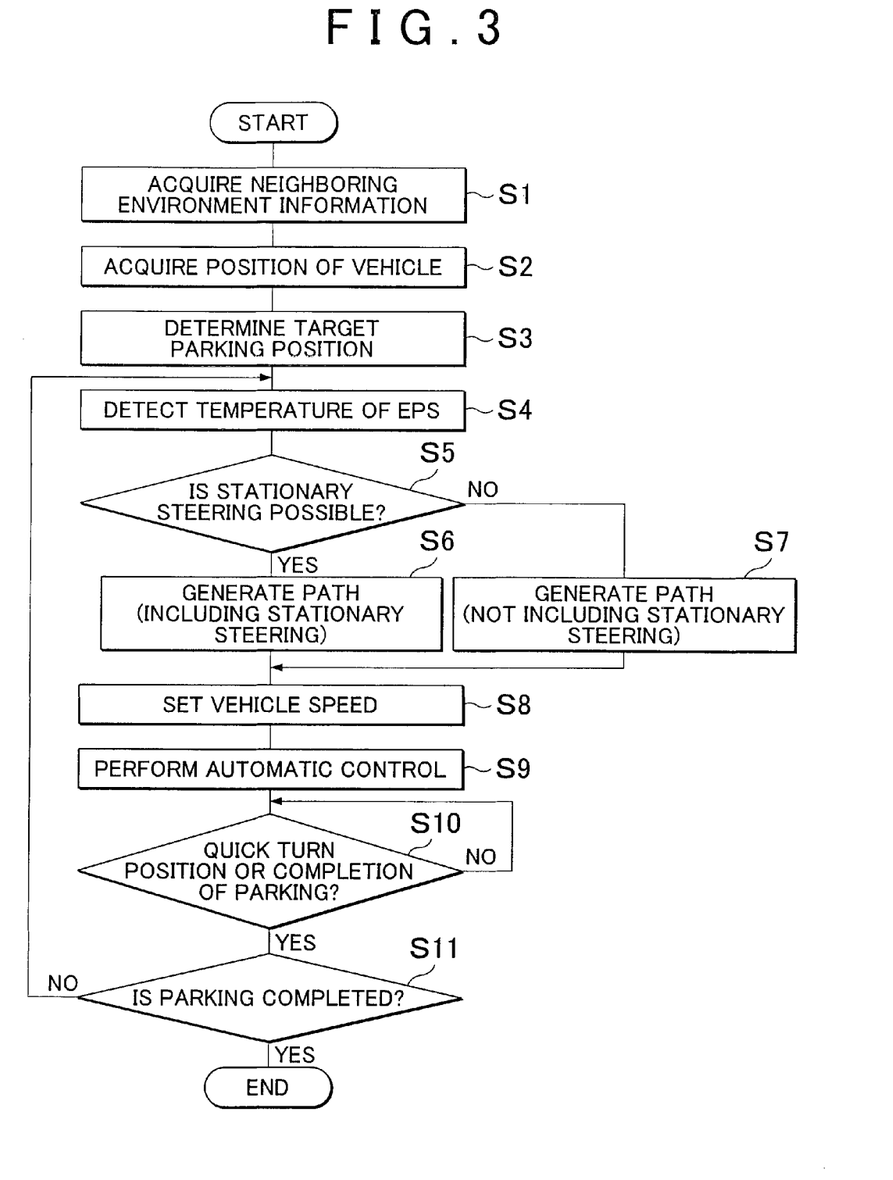
FIG. 3 is a flowchart illustrating a parking assist process that is performed using the parking assist system illustrated in FIG. 1.

The parking assist process of the parking assist system 1 according to this embodiment will be described below with reference to FIGS. 2 and 3. The flowchart illustrated in FIG. 3 shows an example of the parking assist process performed by the parking assist system 1. An example will be described below where the driver of the vehicle 100 turns on the switch 14 at the stop position P2 of the vehicle 100 illustrated in FIG. 2 to assist the vehicle 100 in parking at the target parking position P1 from the stop position P2.

First, the parking assist system 1 starts the parking assist process illustrated in FIG. 3 when the switch 14 is turned on by the driver of the vehicle 100. When the parking assist process is started, the environmental information detecting unit 10 acquires the information on the neighboring environment of the vehicle 100 (step S1). Here, the environmental information detecting unit 10 detects a vehicle B1 and a vehicle B2 located around the vehicle 100 as obstacles and outputs the detection signal relevant to the vehicle B1 and the vehicle B2 to the automatic parking ECU 20.

Then, the vehicle position acquiring unit 21 acquires the stop position P2 as the current position of the vehicle 100 (step S2), and the target parking position determining unit 22 determines the target parking position P1 using the detection signal relevant to the vehicle B1 and the vehicle B2 (step S3). The temperature detecting unit 23 detects the temperature of the EPS motor 31a and the EPS ECU 31b (step S4) and the path generating unit 24 determines whether the stationary steering is possible (step S5).

The path generating unit 24 determines that the stationary steering is possible in step S5 when both the temperature of the EPS motor 31a and the temperature of the EPS ECU 31b are equal to or lower than the temperature threshold value T1, and generates the path L1 including the stationary steering (step S6). On the other hand, the path generating unit 24 determines that the stationary steering is not possible in step S5 when any one of the temperature of the EPS motor 31a and the temperature of the EPS ECU 31b is higher than the temperature threshold value T1, and generates the path L2 not including the stationary steering (step S7).

After the path generating unit 24 generates the path L1 or the path L2 as described above, the vehicle speed setting unit 25 sets the vehicle speed at positions of the path L1 or the path L2 (step S8). Then, the parking assist unit 26 controls the operations of the units of the vehicle 100 so as to cause the vehicle 100 to automatically move along the path L1 or the path L2, by outputting the signals to the EPS unit 31, the brake ECU 32, the power management ECU 33, the SBW unit 34, and the meter ECU 35 (step S9). In step S9, the vehicle 100 moves along the path L1 after it is subjected to the stationary steering at the stop position P2 when the path generating unit 24 generates the path L1, and the vehicle 100 moves along the path L2 without being subjected to the stationary steering when the path generating unit 24 generates the path L2.

In step S10, the parking assist unit 26 determines whether the vehicle 100 reaches the quick turn position P3 or the quick turn position P4 or whether the parking of the vehicle 100 is completed. Here, the determination of whether the parking of the vehicle 100 is completed is performed, for example, on the basis of whether the position of the vehicle 100 acquired by the vehicle position acquiring unit 21 matches the target parking position P1. When it is determined by the parking assist unit 26 in step S10 that the vehicle 100 reaches the quick turn position P3 or the quick turn position P4 or that the parking of the vehicle 100 is completed, the process flow goes to step S11. On the other hand, when it is determined by the parking assist unit 26 in step S10 that the vehicle 100 does not reach the quick turn position P3 or the quick turn position P4 and that the parking of the vehicle 100 is not completed, the process flow returns to step S10.

In step S11, the parking assist unit 26 determines whether the parking of the vehicle 100 is completed. When it is determined by the parking assist unit 26 that the parking of the vehicle 100 is not completed, the vehicle 100 reaches the quick turn position P3 or P4 and thus the process flow returns to step S4. Thereafter, the detecting of the temperature of the EPS unit 31 by the temperature detecting unit 23, the determining of whether the stationary steering is possible, the generating of the path, the setting of the vehicle speed, and the automatic movement of the vehicle 100 are performed again. On the other hand, when it is determined by the parking assist unit 26 in step S11 that the parking of the vehicle 100 is completed, the series of processes ends.

As described above, in the parking assist system 1 according to this embodiment, the path generating unit 24 generates any one of the path L1 including the stationary steering and the path L2 not including the stationary steering on the basis of the temperature of the EPS unit 31. Accordingly, since the path L2 not including the stationary steering can be generated in the state where the temperature of the EPS unit 31 is high, it is possible to avoid the situation in which the temperature of the EPS unit 31 excessively rises due to the generation of heat at the time of stationary steering. Even when the temperature of the EPS unit 31 rises, the automatic steering using the EPS unit 31 is not stopped by simply generating the path L2 not including the stationary steering. Accordingly, it is possible to continue to perform the parking assist using the EPS unit 31 even when the EPS unit 31 is higher than a normal temperature. Here, the normal temperature means a temperature at which the operation of the EPS unit 31 is not affected in using the EPS unit 31.

In the parking assist system 1, the path generating unit 24 generates the path L2 not including the stationary steering when the temperature of the EPS unit 31 is higher than the temperature threshold value T1. Accordingly, the stationary steering is not performed when the temperature of the EPS unit 31 rises. As a result, it is possible to suppress the excessive rise in temperature of the EPS unit 31 and to continue to perform the automatic steering using the EPS unit 31.

The path generating unit 24 generates any one of the path L1 including the stationary steering and the path L2 not including the stationary steering on the basis of the temperature of the EPS motor 31a of the EPS unit 31 and the temperature of the EPS ECU 31b of the EPS unit 31. Accordingly, even when the temperature of any one of the EPS motor 31a and the EPS ECU 31b of the EPS unit 31 rises, the path generating unit 24 generates the path L2 not including the stationary steering. As a result, it is possible to suppress the rise in temperature of the EPS motor 31a and the EPS ECU 31b.

Second Embodiment

Figure 4:
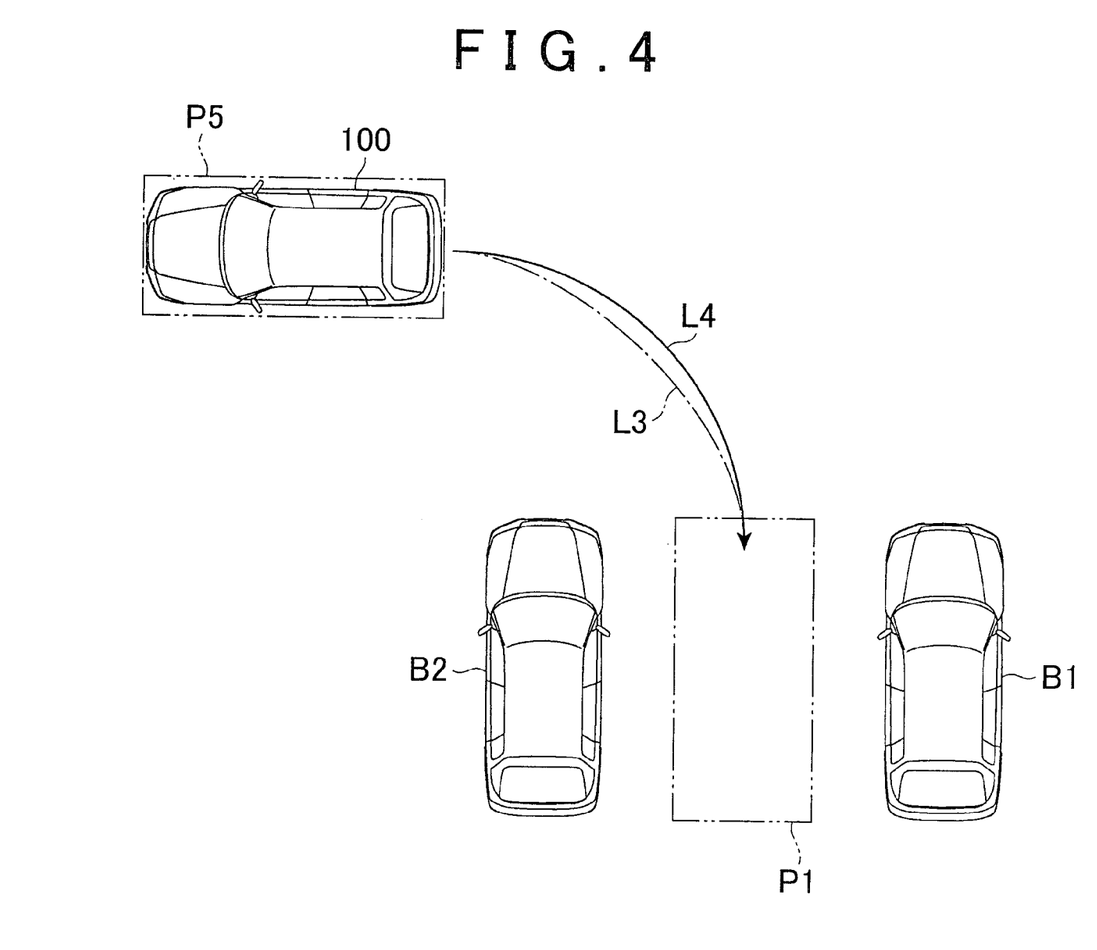
FIG. 4 is a diagram illustrating a path of a vehicle that parks using a parking assist system according to a second embodiment of the invention.
Figure 5:
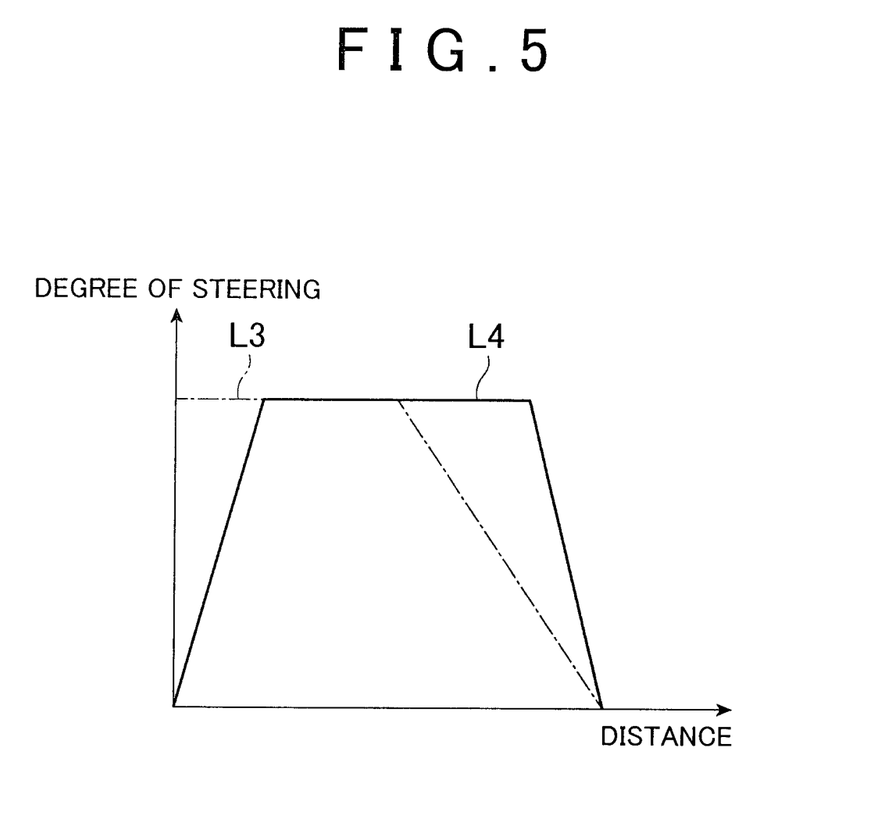
FIG. 5 is a graph illustrating a relationship between the distance of a vehicle from a stop position and a degree of steering.
Figure 6:
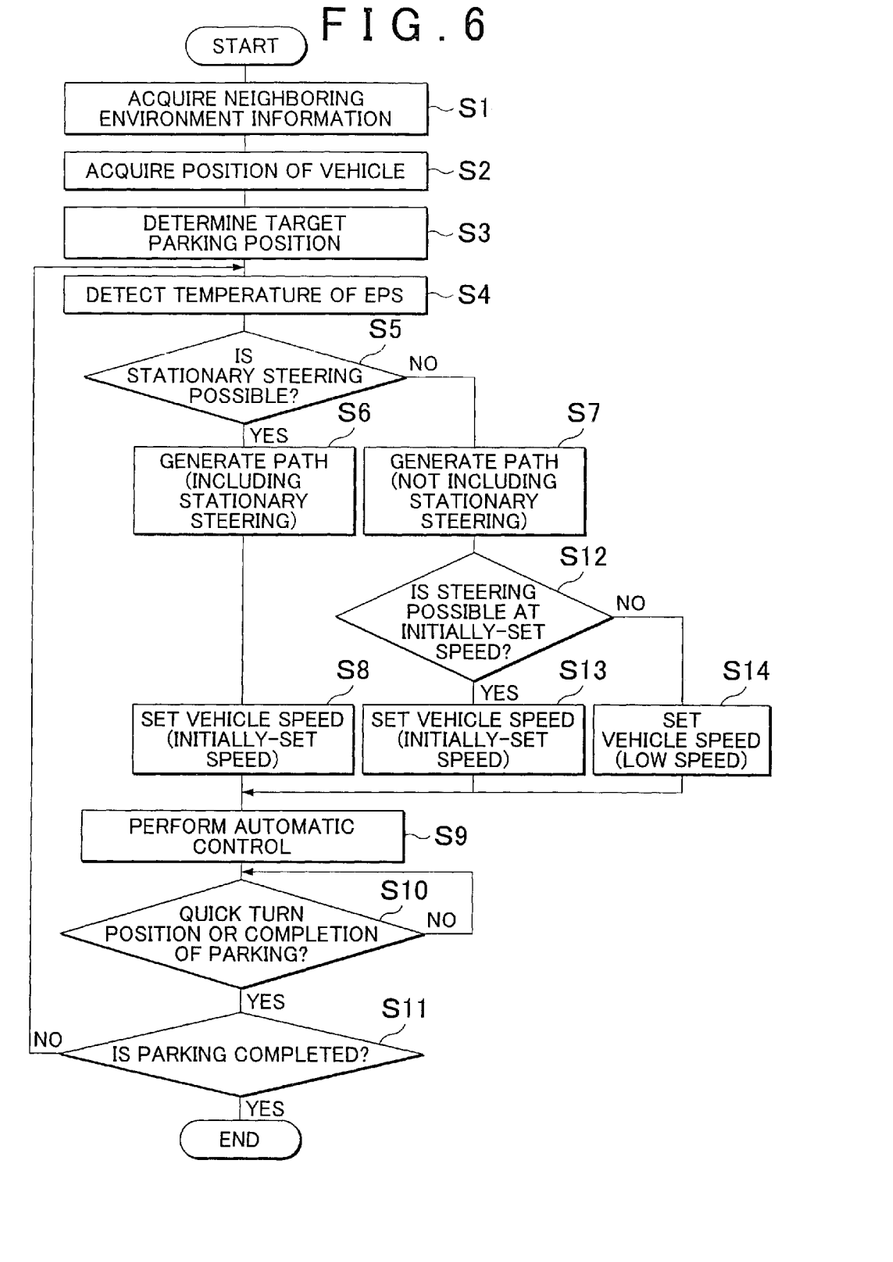
FIG. 6 is a flowchart illustrating a parking assist process that is performed using the parking assist system according to the second embodiment.

A parking assist system according to a second embodiment of the invention will be described below with reference to FIGS. 4 to 6. In FIGS. 4 to 6, the same elements as illustrated in FIGS. 1 to 3 will be referenced by the same reference numerals and description thereof will not be repeated. The parking assist system according to the second embodiment is equal to the parking assist system 1 according to the first embodiment in configuration and is different from the first embodiment in processing details of the path generating unit 24 and the vehicle speed setting unit 25.

As illustrated in FIG. 4, the path generating unit 24 generates any one of a path L3 including the stationary steering and a path L4 not including the stationary steering on the basis of the temperature of the EPS unit 31 detected by the temperature detecting unit 23. Like in the first embodiment, the path generating unit 24 generates the path L3 when both the temperature of the EPS motor 31a and the temperature of the EPS ECU 31b are equal to or lower than the temperature threshold value T1, and generates the path L4 when any one of the temperature of the EPS motor 31a and the temperature of the EPS ECU 31b is higher than the temperature threshold value T1. FIG. 4 illustrates a state where the vehicle 100 stops at the position P5 corresponding to the quick turn positions P3, P4 in FIG. 2 and the parking assist is performed at that position.

As illustrated in FIGS. 4 and 5, the path L3 including the stationary steering is a path in which the steering wheel is turned already at the time point at which the vehicle 100 stops at the position P5 and the steering wheel is slowly returned as the vehicle 100 moves to the target parking position P1. On the other hand, the path LA not including the stationary steering is a path in which the steering wheel is not turned at the time point at which the vehicle 100 stops at the position P5, the steering wheel is quickly turned just after the vehicle 100 starts moving to the target parking position P1, and the steering wheel is quickly returned just before the vehicle 100 reaches the target parking position P1. Accordingly, when the path L4 not including the stationary steering is generated, the degree of steering has to be changed only during movement of the vehicle 100 and thus the degree of steering required for the movement is larger, compared with the case where the path L3 including the stationary steering is generated. Accordingly, when the vehicle moves along the path L4 at the initially-set speed, the steering speed for controlling the steering with the degree of steering required for the movement along the path L4 may also increase and the vehicle 100 may not follow the steering speed.

Therefore, in the second embodiment, the vehicle speed setting unit 25 determines whether the steering based on the initially-set speed is possible when the path generating unit 24 generates the path L4 not including the stationary steering and the vehicle 100 moves along the path LA. For example, the vehicle speed setting unit 25 determines that the steering based on the initially-set speed is not possible when the steering speed required for causing the vehicle 100 to move along the path L4 at the initially-set speed is higher than a predetermined steering speed determined depending on the vehicle performance or the like. The vehicle speed setting unit 25 sets the vehicle speed of the vehicle 100 moving along the path L4 to a speed lower than the initially-set, speed when it is determined that the steering based on the initially-set speed is not possible. For example, the vehicle speed setting unit 25 sets a speed lower than the initially-set speed as the vehicle speed of the vehicle 100 so that the steering speed required for causing the vehicle 100 to move along the path IA is equal to or lower than the predetermined steering speed. The vehicle speed setting unit 25 sets the vehicle speed of the vehicle 100 moving along the path L4 to the initially-set speed when it is determined that the steering based on the initially-set speed is possible. Here, the initially-set speed is a normal speed that is set at the time of performing the parking assist using the parking assist system, and is a speed when the vehicle 100 moves along the path L3 including the stationary steering. The initially-set speed may have one value or may have a range.

As illustrated in the flowchart of FIG. 6, the parking assist process of the parking assist system according to the second embodiment is, different from that of the first embodiment in the processing details subsequent to step S7. After the path generating unit 24 generates the path L4 not including the stationary steering in step S7, the vehicle speed setting unit 25 determines whether the steering is possible when the vehicle 100 is made to move along the path L4 at the initially-set speed (step S12). When it is determined by the vehicle speed setting unit 25 in step S12 that the steering is possible, the vehicle speed setting unit 25 sets the vehicle speed bf the vehicle 100 to the initially-set speed in step S13. On the other hand, when it is determined by the vehicle speed setting unit 25 in step S12 that the steering is not possible, the vehicle speed setting unit 25 sets the vehicle speed of the vehicle 100 to a speed lower than the initially-set speed in step S14.

As described above, after the vehicle speed setting unit 25 sets the vehicle speed of the vehicle 100 in step S13 or step S14, the parking assist unit 26 causes the vehicle 100 to automatically move in step S9. Thereafter, the same processes as in the first embodiment are performed.

As described above, in the second embodiment, since the path generating unit 24 generates any one of the path L3 including the stationary steering and the path L4 not including the stationary steering on the basis of the temperature of the EPS unit 31, the same advantages as in the first embodiment are obtained. In the second embodiment, the vehicle speed setting unit 25 sets the vehicle speed of the vehicle 100 so as to be lower than the initially-set speed when it is determined that the steering based on the initially-set speed is not possible in causing the vehicle 100 to move along the path L4 not including the stationary steering at the initially-set speed. Accordingly, by causing the vehicle speed setting unit 25 to set the vehicle speed of the vehicle 100 so as to be lower than the initially-set speed when it is determined, that the steering is not possible, the path L4 not including the stationary steering is generated. As a result, even when the degree of steering required for moving along the generated path L4 increases, it is possible to reduce the steering speed required for moving along the path L4 and to cause the vehicle 100 to move along the path L4.

Third Embodiment

A parking assist system 101 according to a third embodiment of the invention will be described below with reference to FIGS. 7 to 10. In FIGS. 7 to 10, the same elements as illustrated in FIGS. 1 to 6 will be referenced by the same reference numerals and description thereof will not be repeated. The parking assist system 101 according to the third embodiment is mounted on a vehicle 200. The parking assist system 101 is different from the parking assist system 1 according to the first embodiment, in that an automatic parking ECU 120 including a friction coefficient calculating unit 127 is provided.

Figure 7:
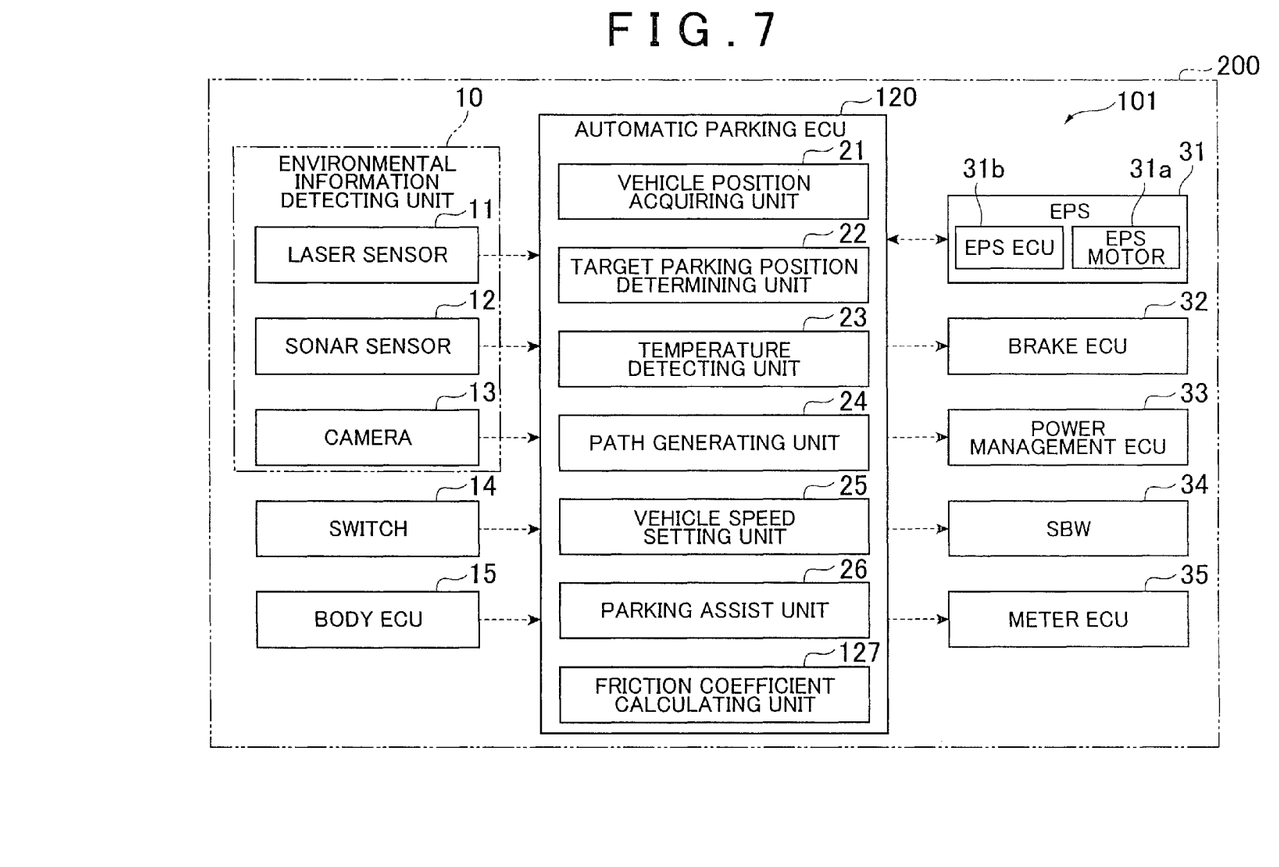
FIG. 7 is a block diagram illustrating a parking assist system according to a third embodiment of the invention.

The friction coefficient calculating unit 127 has a function of calculating a friction coefficient of a road surface around the vehicle 200. The friction coefficient calculating unit 127 calculates the friction coefficient of the road surface around the vehicle 200, for example, from an image obtained by imaging the road surface with the camera 13. A method of calculating the friction coefficient of the road surface around the vehicle 200 is not limited to the method using the captured image, and various other methods may be employed.

Figure 8:
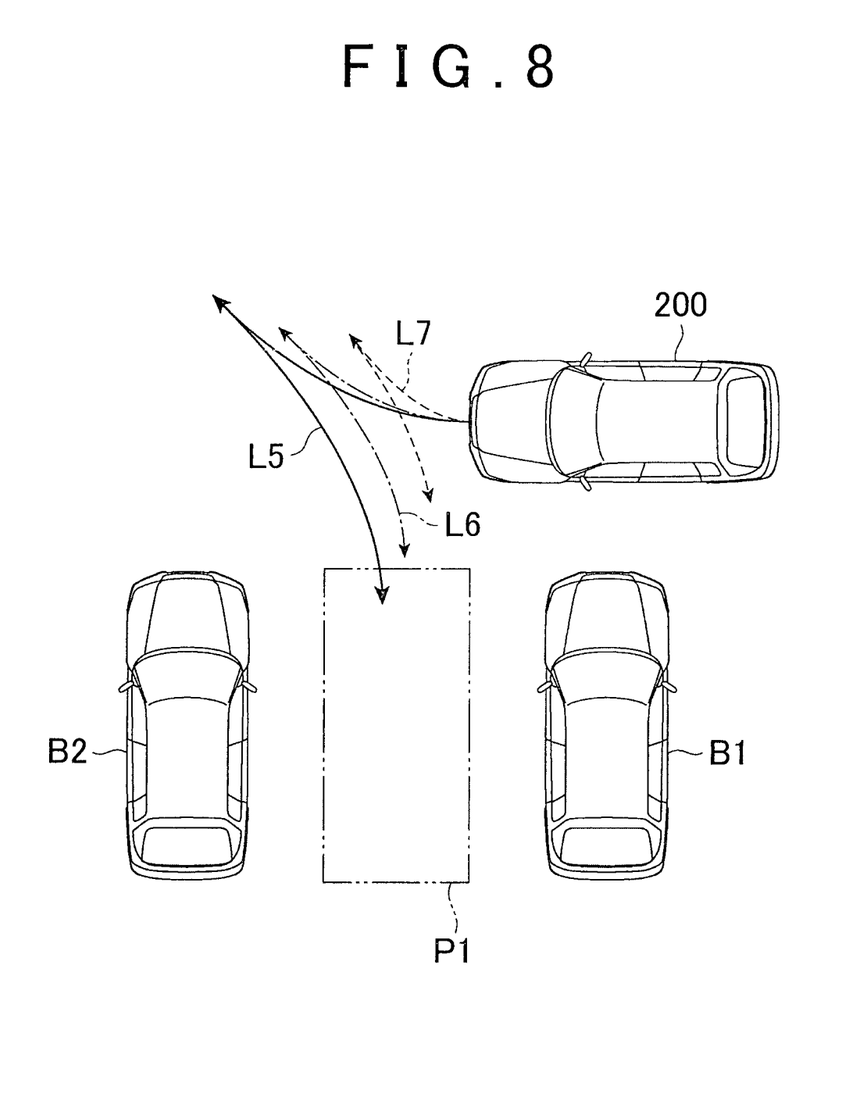
FIG. 8 is a diagram illustrating a path of a vehicle that parks using the parking assist system illustrated in FIG. 7.
Figure 9:
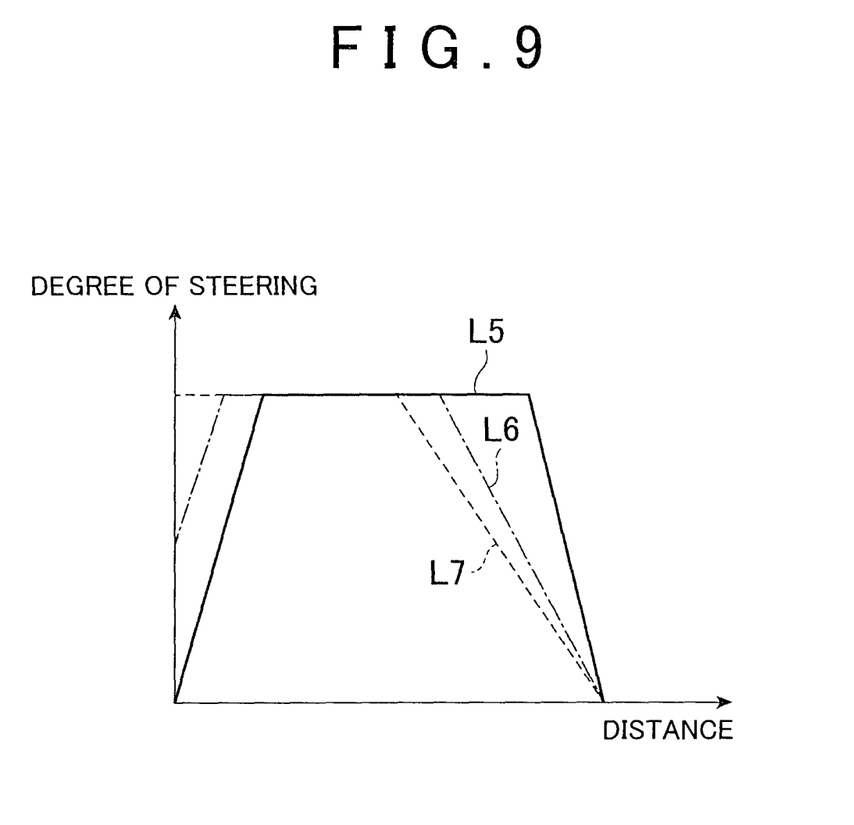
FIG. 9 is a graph illustrating a relationship between the distance of a vehicle from a stop position and a degree of steering.

In the third embodiment, the path generating unit 24 generates, for example, plural paths indicated by paths L5 to L7 in FIGS. 8 and 9. The path L5 is a path not including the stationary steering and the paths L6, L7 are paths including the stationary steering. A degree of stationary steering in the path L7 is larger than the degree of stationary steering in the path L6. Here, the degree of stationary steering means a degree of steering in the state where the vehicle 200 stops.

When the weight of the vehicle 200 increases, the load, applied to the EPS unit 31 increases and thus the temperature of the EPS unit 31 more easily rises. Since the load applied to the EPS unit 31 increases on a road surface having a large friction coefficient, the temperature of the EPS unit 31 more easily rises. Accordingly, in the third embodiment, the path generating unit 24 estimates an allowable degree of stationary steering of the vehicle 200 on the basis of the temperature of the EPS unit 31 detected by the temperature detecting unit 23. Here, the allowable degree of stationary steering is a value used as an upper limit of the degree of stationary steering.

When the weight of the vehicle 200 is greater than a predetermined weight threshold value W1, the path generating unit 24 generates a path having a smaller degree of stationary steering by decreasing the allowable degree of stationary steering in comparison with the weight of the vehicle 200 is equal to or less than the weight threshold value W1. When the friction coefficient calculated by the friction coefficient calculating unit 127 is greater than a predetermined friction coefficient threshold value $\mu 1$, the path generating unit 24 generates path having a smaller degree of stationary steering by decreasing the allowable degree of stationary steering in comparison with the friction coefficient is equal to or less than the case where the friction coefficient threshold value $\mu 1$.

Here, the weight threshold value W1 is a reference for determination of whether the vehicle has a weight in which the load applied to the EPS unit 31 is great and the temperature of the EPS unit 31 easily rises. Similarly, the friction coefficient threshold value $\mu 1$ is a reference for determination of whether the road surface has a friction coefficient in which the load applied to the EPS unit 31 is great and the temperature of the EPS unit 31 easily rises. The weight threshold value W1 and the friction coefficient threshold value $\mu 1$ are values set in advance depending on the specification of the EPS unit 31 or the environment and can be appropriately changed.

The path generating unit 24 sets the degree of stationary steering with the estimated allowable degree of stationary steering as an upper limit and generates, for example, any one of the path L5 not including the stationary steering, the path L6 having a small degree of stationary steering, and the path L7 having a large degree of stationary steering. Accordingly, the path generating unit 24 generates a path Corresponding to the set degree of stationary steering as the path on which the vehicle 200 moves. The path generated by the path generating unit 24 is not limited to three paths of the paths L5 to L7 and, for example, two or four or more paths may be used.

Figure 10:
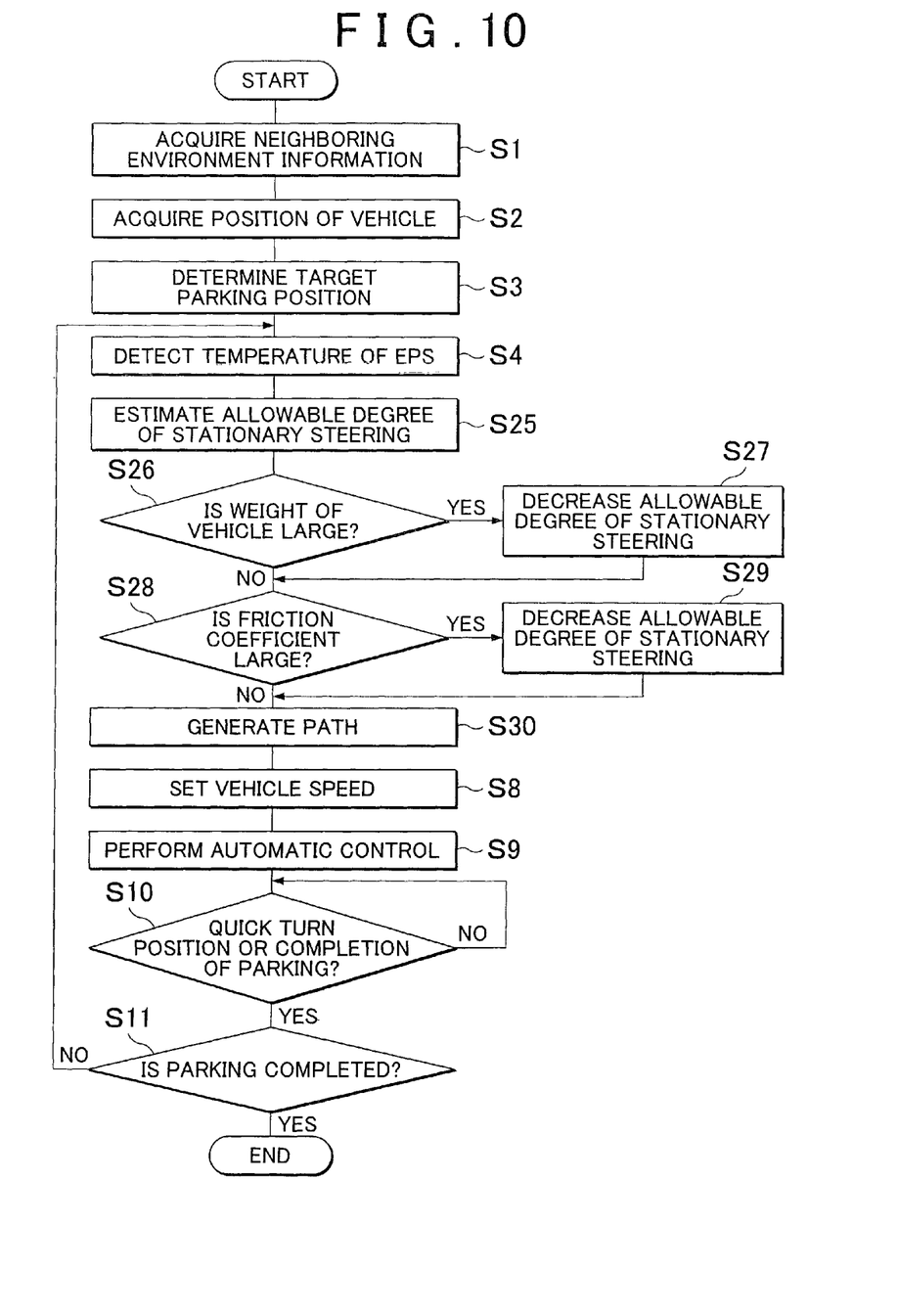
FIG. 10 is a flowchart illustrating a parking assist process that is performed using the parking assist system illustrated in FIG. 7.

As illustrated in the flowchart of FIG. 10, the parking assist process of the parking assist system 101 according to the third embodiment is different from that of the first embodiment, in the processing details subsequent to step S4. After the temperature detecting unit 23 detects the temperature of the EPS unit 31 in step S4, the path generating unit 24 estimates the allowable degree of stationary steering of the vehicle 200 on the basis of the temperature of the EPS unit 31 (step S25). Then, the path generating unit 24 determines whether the weight of the vehicle 200 is greater than the weight threshold value W1 (step S26).

When it is determined by the path generating unit 24 in step S26 that the weight is greater than the weight threshold value W1, the path generating unit 24 decreases the allowable degree of stationary steering (step s27) and performs the process of step S28. On the other hand, when it is determined by the path generating unit 24 in step S26 that the weight is not greater than the weight threshold value W1, the process flow goes to step S28. In step S28, the path generating unit 24 determines whether the friction coefficient of the road surface around the vehicle 200 is greater than the friction coefficient threshold value µ1. When it is determined by the path generating unit 24 in step S28 that the friction coefficient is greater than the friction coefficient threshold value µ1, the path generating unit 24 decreases the allowable degree of stationary steering (step S29) and then performs the process of step S30. On the other hand, when it is determined by the path generating unit 24 in step S28 that the friction coefficient is not greater than the friction coefficient threshold value µ1, the process of step S30 is performed.

In step S30, the path generating unit 24 sets the degree of stationary steering from the allowable degree of stationary steering and generates a path corresponding to the set degree of stationary steering. The path generating unit 24 generates, for example, any one of the paths L5 to L7 depending on the degree of stationary steering. Thereafter, the processes as in the first embodiment are performed.

As described above, in the third embodiment, the path generating unit 24 estimates the allowable degree of stationary steering on the basis of the temperature of the EPS unit 31, sets the degree of stationary steering with the allowable degree of stationary steering as the upper limit, and generates any one of the paths L5 to L7 depending on the set degree of stationary steering. Accordingly, the allowable degree of stationary steering is estimated on the basis of the temperature of the EPS unit 31 and the degree of stationary steering is sets with the allowable degree of stationary steering as the upper limit. As a result, by estimating the allowable degree of stationary steering as the upper limit of the degree of stationary steering to be small when the temperature of the EPS unit 31, is high, it is possible to suppress the generation of heat due to the stationary steering. Accordingly, it is possible to suppress the excessive rise in temperature of the EPS unit 31.

In the third embodiment, when the path generating unit 24 generates a path including the stationary steering and the weight of the vehicle 200 acquired by the body ECU 15 is greater than the weight threshold value W1, a path having a smaller degree of stationary steering, is generated in comparison with the case where the weight is equal to or less than the weight threshold value W1. Accordingly, it is possible to suppress the rise in temperature of the EPS unit 31 by generating a path having a smaller degree of stationary steering when the weight of the vehicle 200 is greater than the weight threshold value W1.

When the path generating unit 24 generates a path including the stationary steering and the friction coefficient calculated by the friction coefficient calculating unit 127 is greater than the friction coefficient threshold value µ1, a path having a smaller degree of stationary steering is generated in comparison with the case where the friction coefficient is equal to or less than the friction coefficient threshold value µ1. Accordingly, it is possible to suppress the rise in temperature of the EPS unit 31 by generating a path having a smaller degree of stationary steering when the friction coefficient is greater than the friction coefficient threshold value µ1.

In the third embodiment, the path generating unit 24 sets the degree of stationary steering depending on the temperature of the EPS unit 31, the weight of the vehicle 200, and the friction coefficient of the road surface, and generates a path on the basis of the set degree of stationary steering. Accordingly, it is possible to suppress the rise in temperature of the EPS unit 31 by setting the degree of stationary steering in the vehicle 200 with high accuracy and generating the path on the basis of the degree of stationary steering.

The parking assist system according to the invention is not limited to the description of this embodiment. The parking assist system according to the invention may be obtained by modifying the parking assist system according to the third embodiment without changing the gist described in the appended claims.

For example, in the first embodiment, the path generating unit 24 generates the path L1 including the stationary steering when both the temperature of the EPS motor 31a and the temperature of the EPS ECU 31b are equal to or lower than the temperature threshold value T1, and generates the path L2 not including the stationary steering when any one of the temperature of the EPS motor 31a and the temperature of the EPS ECU 31b is higher than the temperature threshold value T1. In the third embodiment, the path generating unit 24 generates the path on the basis of the temperature of the EPS unit 31, the weight of the vehicle 200, and the friction coefficient of the road surface.

However, the path generating unit 24 may generate the path, for example, on the basis of a slope angle of a front-downward slope of the vehicle acquired by the body ECU 15. In this case, the path generating unit 24 generates a path having a small degree of stationary steering when the front-downward slope angle is greater than a predetermined angle, and generates a path having a large degree of stationary steering when the front-downward slope angle is equal to or less than the predetermined angle. That is, the condition used for the path generating unit 24 to generate the path is not limited to the conditions of the above-mentioned embodiments.

In the first embodiment, the path generating unit 24 generates any one of the path L1 including the stationary steering and the path L2 not including the stationary steering on the basis of the temperature of the EPS unit 31, but the method of generating the path in the path generating unit 24 is not limited to the embodiment. For example, the path generating unit 24 may determine the path on which the vehicle 100 moves by generating plural paths having different degrees of stationary steering and selecting one path out of the generated plural paths.

In the first, to third embodiments, the body ECU, 15 and the vehicle speed setting unit 25 are provided, but the body ECU 15 may be removed from the first and second embodiment. In case of the parking assist system performing only the automatic steering using the EPS unit 31 and not performing the automatic movement, the brake ECU 32, the power management ECU 33, the SBW unit 34, and the meter ECU 35 may be removed. Accordingly, the configuration of the parking assist system according to the invention can be appropriately changed.

In the flowcharts illustrated in FIGS. 3, 6, and 10, for example, the order of steps S1 to S3 may be changed, and a necessary process may be added or an unnecessary process may be removed.

In the first to third embodiments, the automatic parking ECU 20 having the path generating unit 24 is mounted on the vehicle 100, but the path generating unit 24 may be mounted on an apparatus other than the vehicle 100, for example, by acquiring the path through the use of road-vehicle communication.

The parking assist system according to the invention includes a parking assist system having the feature of any one of the first embodiment, the second embodiment, and the third embodiment. The parking assist system according to the invention also includes a parking assist system in which the features of two or three of the first embodiment, the second embodiment, and the third embodiment are combined.

The invention claimed is:

1. A parking assist system that assists a vehicle in parking at a target parking position by automatically steering an electric power steering unit, comprising:
    a vehicle position acquiring unit configured to acquire the position of the vehicle;
    a target parking position determining unit configured to determine the target parking position;
    a path generating unit configured to generate a path from the position of the vehicle to the target parking position;
    a temperature detecting unit configured to detect the temperature of the electric power steering unit; and
    a parking assist unit configured to automatically steer the vehicle so as to move along the path generated by the path generating unit,
    wherein the path generating unit generates a path in which a degree of stationary steering by which the vehicle is steered in a state where the vehicle stops is small when the temperature of the electric power steering unit detected by the temperature detecting unit is high, compared with when the temperature of the electric power steering unit is low.

2. The parking assist system according to claim 1, wherein the path generating unit generates a path not including the stationary steering when the temperature of the electric power steering unit detected by the temperature detecting unit is higher than a predetermined temperature threshold value.

3. The parking assist system according to claim 1, wherein the path generating unit estimates an allowable degree of stationary steering on the basis of the temperature and sets the degree of stationary steering with the allowable degree of stationary steering as an upper limit when the path generating unit generates a path including the stationary steering on the basis of the temperature of the electric power steering unit detected by the temperature detecting unit.

4. The parking assist system according to claim 1, further comprising a vehicle speed setting unit configured to set a vehicle speed of the vehicle so that the vehicle speed of the vehicle moving on the path is lower than an initially-set speed when a path not including the stationary steering is generated by the path generating unit and it is determined that the steering based on the initially-set speed is not possible in a state where the vehicle moves along the path.

5. The parking assist system according to claim 1, further comprising a weight information acquiring unit configured to acquire weight information of the vehicle that is information on the weight of the vehicle,
    wherein the path generating unit generates a path in which the degree of stationary steering is small when the path generating unit generates a path including the stationary steering and the weight of the vehicle acquired by the weight information acquiring unit is greater than a predetermined weight threshold value, compared with when the weight of the vehicle is equal to or less than the weight threshold value.

6. The parking assist system according to claim 1, further comprising a friction coefficient calculating unit configured to calculate a friction coefficient of a road surface around the vehicle,
    wherein the path generating unit generates a path in which the degree of stationary steering is small when the path generating unit generates a path including the stationary steering and the friction coefficient calculated by the friction coefficient calculating unit is greater than a predetermined friction coefficient threshold value, compared with when the friction coefficient is equal to or less than the friction coefficient threshold value.

7. The parking assist system according to claim 1, wherein the electric power steering unit includes a motor and an electronic control unit configured to control the motor, and
    wherein the temperature of the electric power steering unit includes the temperature of the motor and the temperature of the electric control unit.

* * * * *